United States Patent
Ahmad et al.

(10) Patent No.: US 6,851,069 B1
(45) Date of Patent: Feb. 1, 2005

(54) METHOD, APPARATUS, AND SYSTEM FOR HIGH SPEED DATA TRANSFER USING PROGRAMMABLE DLL WITHOUT USING STROBES FOR READS AND WRITES

(75) Inventors: Abid Ahmad, Folsom, CA (US); Katen Shah, Orangevale, CA (US); Alankar Saxena, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/539,082

(22) Filed: Mar. 30, 2000

Related U.S. Application Data

(60) Provisional application No. 60/175,834, filed on Jan. 13, 2000.

(51) Int. Cl.$^7$ .................................................. G06F 1/12
(52) U.S. Cl. ........................ 713/503; 713/401; 713/500
(58) Field of Search ................................. 713/500, 501, 713/503; 375/219, 220; 711/105, 169

(56) References Cited

U.S. PATENT DOCUMENTS 6,363,465 B1 * 3/2002 Toda ........................... 711/169

\* cited by examiner

*Primary Examiner*—Lynne H. Browne
*Assistant Examiner*—Paul Yanchus
(74) *Attorney, Agent, or Firm*—Blakely, Sokoloff, Taylor & Zafman LLP

(57) ABSTRACT

According to one aspect of the invention, a method is provided in which a first clock signal is generated. A second clock signal is derived from the first clock signal. The second clock signal is delayed relative to the first clock signal by a first delay period by a delay locked loop (DLL) circuit. The second clock signal is used to latch incoming data from a memory device.

21 Claims, 6 Drawing Sheets

|  | DRAM READ SETUP | | DRAM READ HOLD | |
|---|---|---|---|---|
| Driver | 100 MHz | 125 MHz | Driver | 100 MHz | 125 MHz |
| DRAM | 2 SODIMMs 2-4 LOADS | 2 SODIMMs 2-4 LOADS | DRAM | 2 SODIMMs 2-4 LOADS | 2 SODIMMs 2-4 LOADS |
| tco.DRAM.max | 7.00 | 6.00 | tco.DRAM.max | 2.50 | 2.50 |
| tflight.max | 1.60 | 1.60 | tflight.max | 0.30 | 0.30 |
| tsso.brd.max | 0.30 | 0.30 | tsso.brd.max | 0.00 | 0.00 |
| Tclk.Flight.max | 2.25 | 2.25 | Tclk.Flight.max | 1.67 | 1.67 |
| Rclk.Flight.max | -3.65 | -3.65 | Rclk.Flight.max | -2.04 | -2.04 |
| DLLDelay | 0.00 | 0.00 | DLLDelay | 0.00 | 0.00 |
| DLLDelayError | 0.00 | 0.00 | DLLDelayError | 0.00 | 0.00 |
| tracking.max | 0.47 | 0.47 | tracking.max | -0.47 | -0.47 |
| tskew | 0.30 | 0.30 | tskew | n/a | n/a |
| tjitter | 0.30 | 0.30 | tjitter | n/a | n/a |
| tsu | 1.00 | 0.75 | thld | -1.00 | -0.75 |
| Total | 9.57 | 8.32 | Total | n/a | n/a |
| Period | 10.00 | 8.00 | Period | n/a | n/a |
| Margin | 0.43 | (0.32) | Margin | 0.96 | 1.21 |

FIG. 3
(Prior Art)

| | DRAM READ SETUP | | | | DRAM READ HOLD | | | |
|---|---|---|---|---|---|---|---|---|
| Driver | 100 MHz | 125 MHz | 143 MHz | 150 MHz | Driver | 100 MHz | 125 MHz | 143 MHz | 150 MHz |
| DRAM | 2 SODIMMs 2-4 LOADS | 2 SODIMMs 2-4 LOADS | 2 SODIMMs 2-4 LOADS | 2 SODIMMs 2-4 LOADS | DRAM | 2 SODIMMs 2-4 LOADS | 2 SODIMMs 2-4 LOADS | 2 SODIMMs 2-4 LOADS | 2 SODIMMs 2-4 LOADS |
| tco.DRAM.max | 7.00 | 6.00 | 5.50 | 5.00 | tco.DRAM.max | 2.50 | 2.50 | 2.50 | 2.50 |
| tflight.max | 1.60 | 1.60 | 1.60 | 1.60 | tflight.max | 0.30 | 0.30 | 0.30 | 0.30 |
| tsso.brd.max | 0.30 | 0.30 | 0.30 | 0.30 | tsso.brd.max | 0.00 | 0.00 | 0.00 | 0.00 |
| Tclk.Flight.max | 2.25 | 2.25 | 2.25 | 2.25 | Tclk.Flight.max | 1.67 | 1.67 | 1.67 | 1.67 |
| Rclk.Flight.max | -3.65 | -3.65 | -3.65 | -3.65 | Rclk.Flight.max | -2.04 | -2.04 | -2.04 | -2.04 |
| DLLDelay | -0.50 | -1.00 | -1.00 | -1.00 | DLLDelay | -0.50 | -1.00 | -1.00 | -1.00 |
| DLLDelayError | 0.05 | 0.10 | 0.10 | 0.10 | DLLDelayError | -0.05 | -0.10 | -0.10 | -0.10 |
| tracking.max | 0.47 | 0.47 | 0.47 | 0.47 | tracking.max | -0.47 | -0.47 | -0.47 | -0.47 |
| tskew | 0.30 | 0.30 | 0.30 | 0.30 | tskew | n/a | n/a | n/a | n/a |
| tjitter | 0.30 | 0.30 | 0.30 | 0.30 | tjitter | n/a | n/a | n/a | n/a |
| tsu | 1.00 | 0.75 | 0.75 | 0.75 | thld | -1.00 | -0.75 | -0.75 | -0.75 |
| Total | 9.12 | 7.42 | 6.92 | 6.42 | Total | n/a | n/a | n/a | n/a |
| Period | 10.00 | 8.00 | 6.99 | 6.67 | Period | n/a | n/a | n/a | n/a |
| Margin | 0.88 | 0.58 | 0.07 | 0.25 | Margin | 0.41 | 0.11 | 0.11 | 0.11 |

FIG. 8

METHOD, APPARATUS, AND SYSTEM FOR HIGH SPEED DATA TRANSFER USING PROGRAMMABLE DLL WITHOUT USING STROBES FOR READS AND WRITES

RELATED APPLICATIONS

This application claims the benefit of U.S. Provisional Application No. 60/175,834, filed Jan. 13, 2000.

FIELD OF THE INVENTION

The present invention relates generally to the field of data transfer technology. More specifically, the present invention relates to a method, apparatus, and system for high speed data transfer using programmable delay locked loop (DLL) without using strobes for reads and writes.

BACKGROUND

Currently, graphics controllers/accelerators such as the Intel 740 supports local memory interface from 66.67 MHz to 100 MHz. A typical graphics controller/accelerator such as the Intel 740 has its own local memory that uses either single data rate synchronous dynamic random access memory (SDR-SDRAM) devices or dual data rate synchronous dynamic random access memory (DDR-SDRAM) devices. SDR-SDRAM devices operate according to the "PCSDRAM-100" specification. PCSDRAM-100 specifies data transfers at a maximum transfer rate of 100 MHz. As DRAM vendors move their silicon to next generation processes ($\leq 0.25\mu$), the capability to produce higher frequency SDRAM devices will increase.

A diagram of a phase locked loop (PLL) circuit is shown in FIG. 1 that illustrates the generation of two clock signals, oCLK and iCLK. The oCLK is used for external DQ I/O clocking and iCLK is used internally for clocking control signals. The iCLK is oCLK plus a delay equal to period of the Fvco of the PLL. This allows for adding a fixed PLL delay to the iCLK. This fixed delay is relatively insensitive to changes in process, temperature and voltage.

FIG. 1 shows various fixed PLL delays at corresponding frequencies. At 100 MHz, N/M is 9/2 and 1/P is 1/3 which gives a PLL delay of 3.3 ns. FIG. 2 illustrates a local memory I/O configuration in a typical graphics controller/accelerator such as the Intel 740. The oCLK is used to generate tCLK and rCLK. The tCLK (transmit clock) is sent to the SDRAM and rCLK (receive clock) is used to latch the incoming data from SDRAM. By routing rCLK to add delay on the motherboard the incoming data can be provided enough setup and hold margins at frequencies between 66.66 MHz and 100 MHz. This currently yields approximately a 1.2 ns of margin on the data window.

By increasing the frequency beyond 100 MHz, even though the data window is maintained, setup is violated while more margin is given to the hold. This problem is shown in FIG. 3. The calculations assume the best case layout and loading conditions.

In order to ensure valid data latching for high speed data transfer (e.g., at higher frequencies than 100 MHz), it is necessary to center the data window around the point of sampling which uses rCLK in this case. One way to center the rCLK is to change its trace length. However, trace length increases are not programmable and more importantly do not provide granularity of control under 1 ns.

SUMMARY OF THE INVENTION

According to one aspect of the invention, a method is provided in which a first clock signal is generated. A second clock signal is derived from the first clock signal. The second clock signal is delayed relative to the first clock signal by a first delay period by a delay locked loop (DLL) circuit. The second clock signal is used to latch incoming data from a memory device.

BRIEF DESCRIPTION OF THE DRAWINGS

The features and advantages of the present invention will be more fully understood by reference to the accompanying drawings, in which:

FIG. 3 shows a table of data illustrating a problem with setup and hold margins at high frequencies;

FIG. 8 shows a table of data illustrating setup/hold margins based on data centering techniques in accordance with the teachings of the present invention.

DETAILED DESCRIPTION

In the following detailed description numerous specific details are set forth in order to provide a thorough understanding of the present invention. However, it will be appreciated by one skilled in the art that the present invention may be practiced without these specific details.

The present invention provides a method, apparatus, and system that allows high speed data transfer at higher frequencies than 100 MHz. In one embodiment, a first clock signal is generated by a receiving agent (e.g., a memory interface of a graphics controller/accelerator). A second clock signal is derived from the first clock signal using a delay locked loop (DLL) circuit. The second clock signal is delayed relative to the first clock signal by a first delay period by the DLL circuit. In one embodiment, the second clock signal is used to clock a latching device to latch the incoming data from a memory unit (e.g., a local memory unit coupled to the graphics controller/accelerator). The incoming data is latched in response to the edge transition of the second clock signal. In one embodiment, the second clock signal is aligned with respect to the data window corresponding to the incoming data so that the edge transition of the second clock signal occurs at such a point to provide sufficient setup time and hold time for the latching device to timely latch the incoming data from the memory unit. In one embodiment, the DLL circuit is programmable via a register. The first delay period corresponds to a value stored in the register. The teachings of the present invention are applicable to any memory interface or memory controller that is used to control the data transfer between a graphics controller/accelerator and a local memory unit. However, the teachings of the present invention are not limited to memory interfaces between graphics accelerators and their corresponding local memory units and can also be applied to any other scheme, method, apparatus, or system for high speed data transfer between a host device and a memory device.

Figure 4:
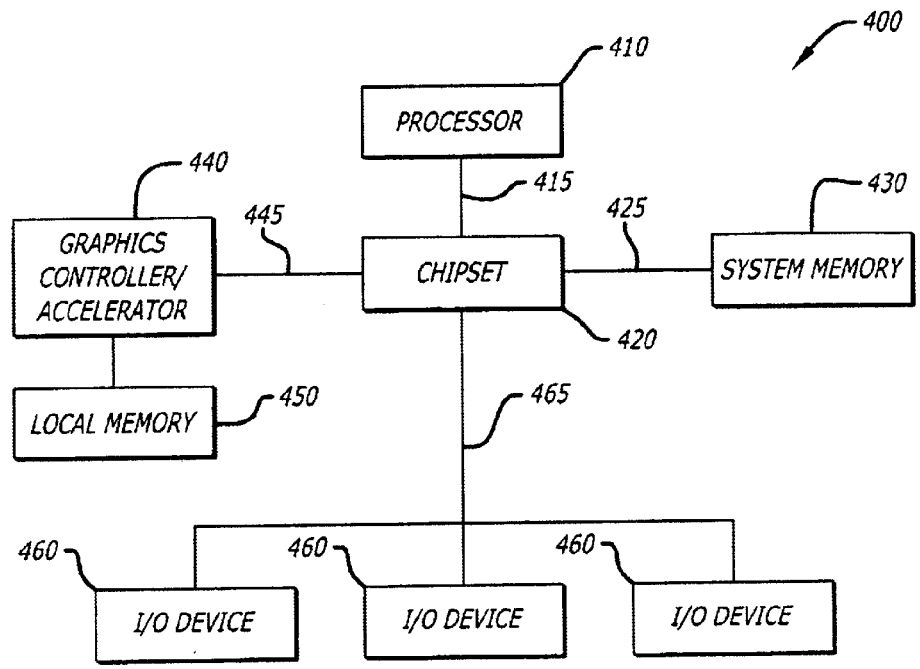
FIG. 4 shows a block diagram of one embodiment of a system according to the teachings of the present invention.

FIG. 4 shows a block diagram of one embodiment of a system 400 according to the teachings of the present invention. The system 400 as shown in FIG. 4 includes one or more processors 410, a chipset unit 420, a system memory unit 430, a graphics controller/accelerator unit 440, a local memory unit 450, and various I/O devices 460. For the purposes of the present specification, the term "processor" or "CPU" refers to any machine that is capable of executing a sequence of instructions and shall be taken to include, but not be limited to, general purpose microprocessors, special purpose microprocessors, multi-media controllers and microcontrollers, etc. In one embodiment, the processors 410 are general-purpose microprocessors that are capable of executing an Intel Architecture instruction set. The chipset unit 420 is coupled to the processor 410 via a host bus 415 and coupled to the memory unit 430 via a memory bus 425. The graphics controller/accelerator 440 is coupled to the chipset unit 420 via an AGP bus 445. In one embodiment, the chipset unit 420 may be an Intel chipset. In one embodiment, the graphics controller/accelerator 440 may be an Intel graphics accelerator. The teachings of the present invention, however, are not limited to Intel products and/or architecture and are applicable to any other products and/or architecture. In one embodiment, the chipset unit 420 includes a memory control unit (not shown) that controls the interface between various system components and the system memory unit 430. The various I/O units 460, in one embodiment, are coupled to the chipset unit 420 via an I/O bus or PCI bus 465.

Figure 5:
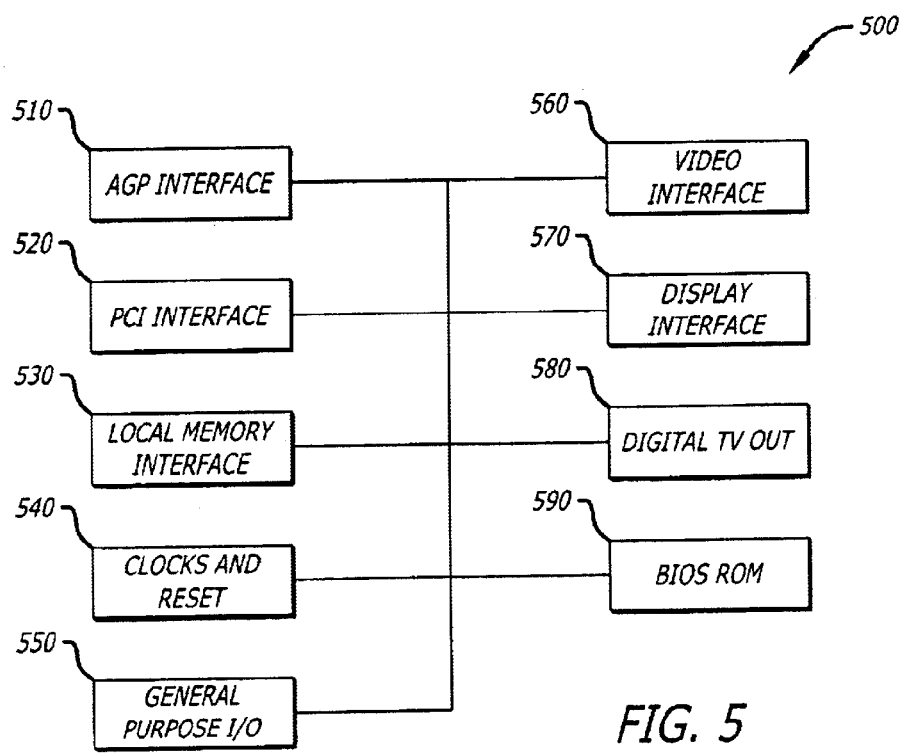
FIG. 5 shows a block diagram of one embodiment of a graphics controller/accelerator according to the teachings of the present invention.

FIG. 5 shows a block diagram of one embodiment 500 of the graphics controller/accelerator 440 described in FIG. 4. The graphics controller 440, in one embodiment, includes an AGP interface 510, a PCI interface 520, a local memory interface 530, a clocks and reset unit 540, a general purpose I/O unit 550, a video interface 560, a display interface 570, a digital TV Out unit 580, and a BIOS ROM 590. The structure and operation of the local memory interface unit 530 are described in more detail below. In one embodiment, the local memory interface 530 controls the interface (e.g., data transfer) between the graphics accelerator 540 and the local memory unit 550.

Figure 6:
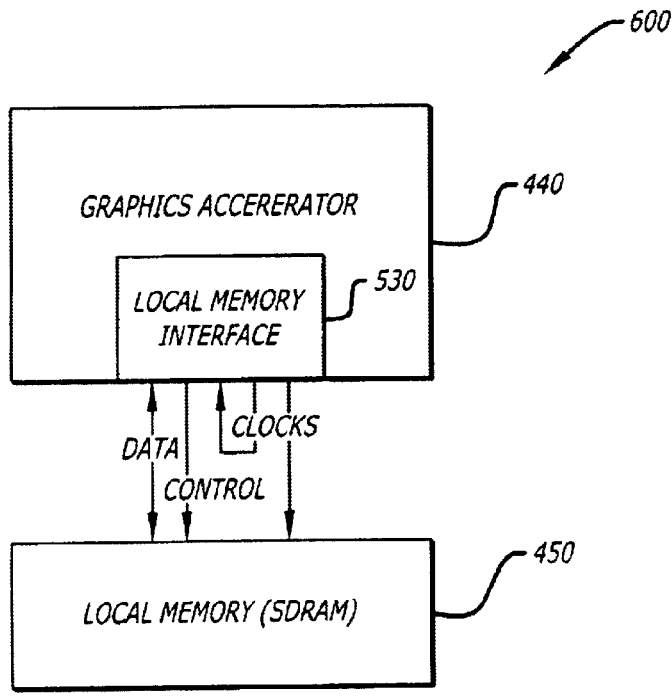
FIG. 6 is a block diagram of one embodiment of a local memory interface unit according to the teachings of the present invention.

FIG. 6 shows various signal interfaces between the local memory interface unit 530 and the local memory 450. As shown in FIG. 6, the local memory interface unit 530 sends data, control, and clock signals to the local memory unit 450 (e.g., SDRAM). The local memory interface unit 530 also receives data from the local memory 450. In one embodiment, the control and clock signals are used by the local memory interface unit 530 to facilitate and control the data transfer between the local memory interface unit 530 and the local memory 450.

Figure 7:
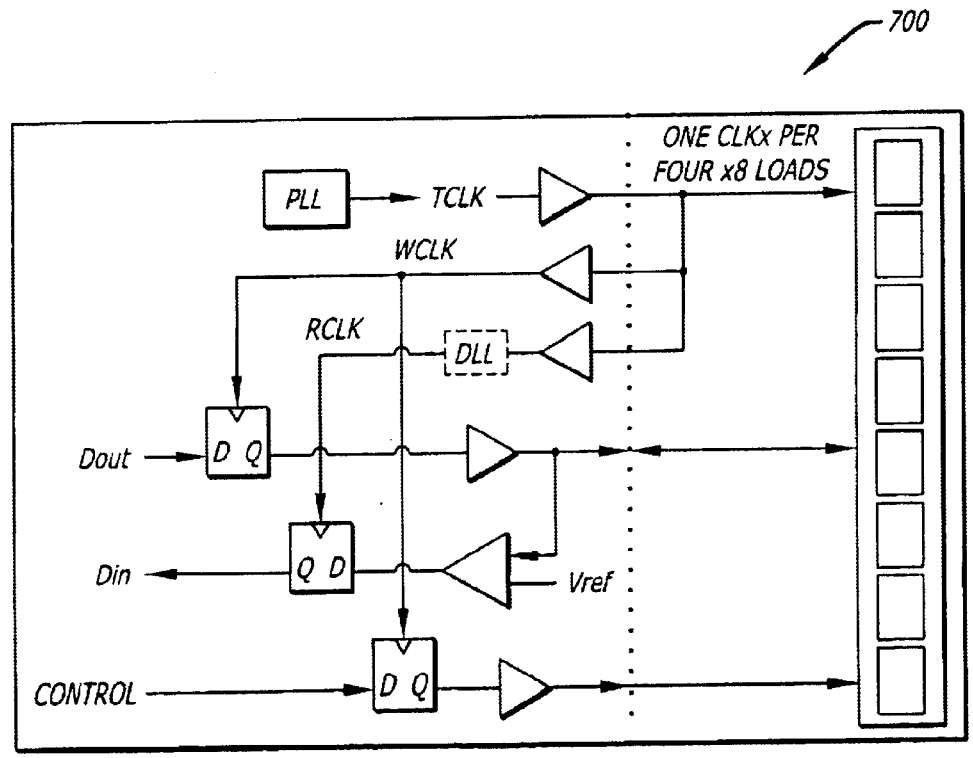
FIG. 7 illustrates a block diagram of a memory I/O structure according to the teachings of the present invention.

FIG. 7 shows a block diagram of one embodiment of a memory I/O structure to facilitate data transfer between the graphics accelerator 440 and the local memory 450 (e.g., SDRAM). In one embodiment, a DLL is included in the rCLK path to adjust the balance between setup and hold margins which allows for high speed data transfer at high frequencies. A programmable DLL that allows for different number of taps would provide finer control in ensuring a valid data signal. The primary application of the DLL is to ensure the centering of the rCLK to the data window. This provides a way to balance the setup and hold margin at higher frequencies. In one embodiment, it is assumed that write data is center with respect to the tclk. The DLL is assumed to be programmable via a register in the chip and would be programmed initially during power up. In one embodiment, the DLL is located in the graphics controller/accelerator 440 rather than in the local memory SDRAM 450. Placing the DLL in the graphics accelerator 440 maintains minimal impact to the SDRAM in terms of cost and complexity.

Figure 1:
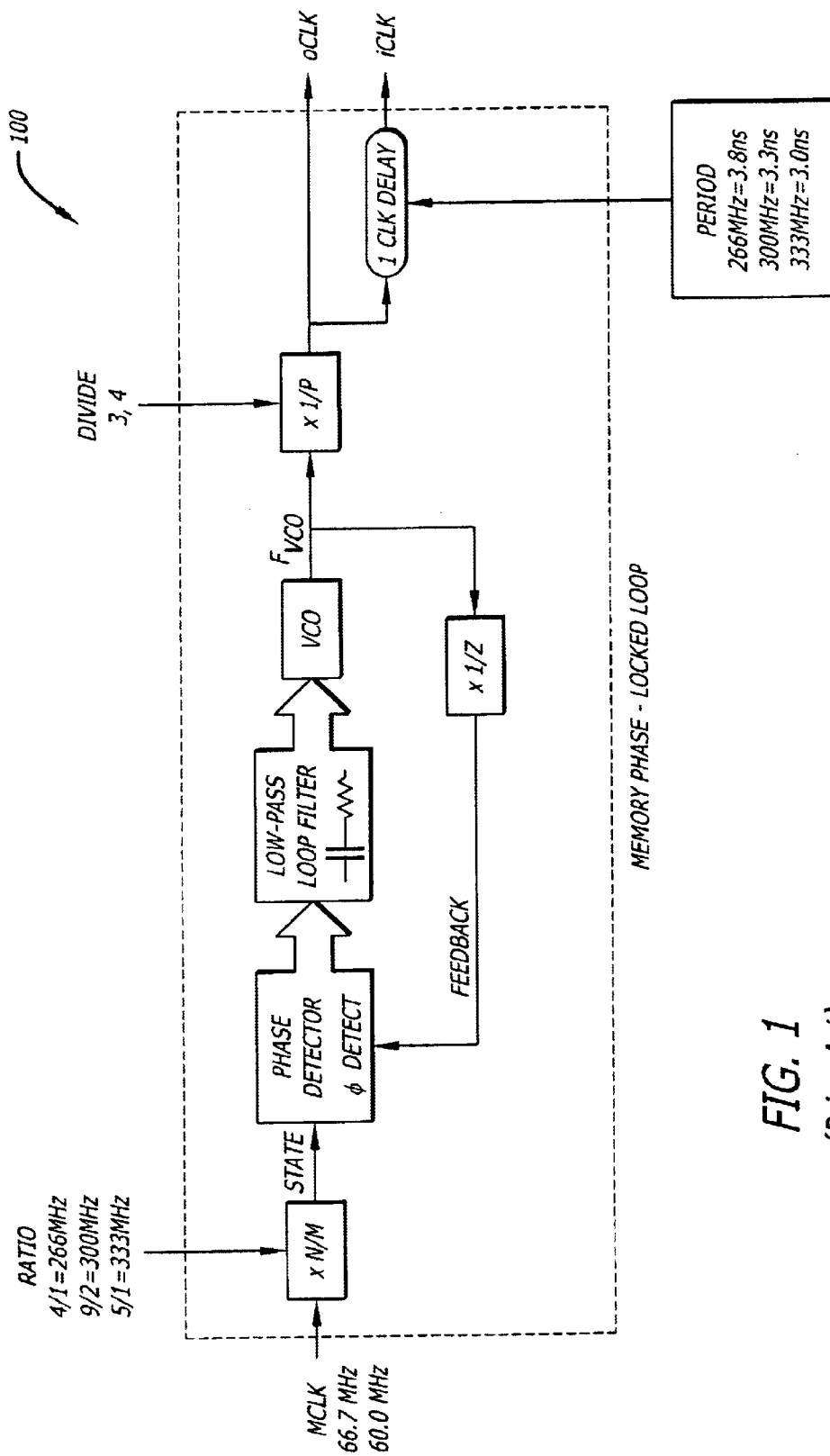
FIG. 1 shows a block diagram of one embodiment of a PLL that is used to generate clock signals for clocking data and control signals.
Figure 2:
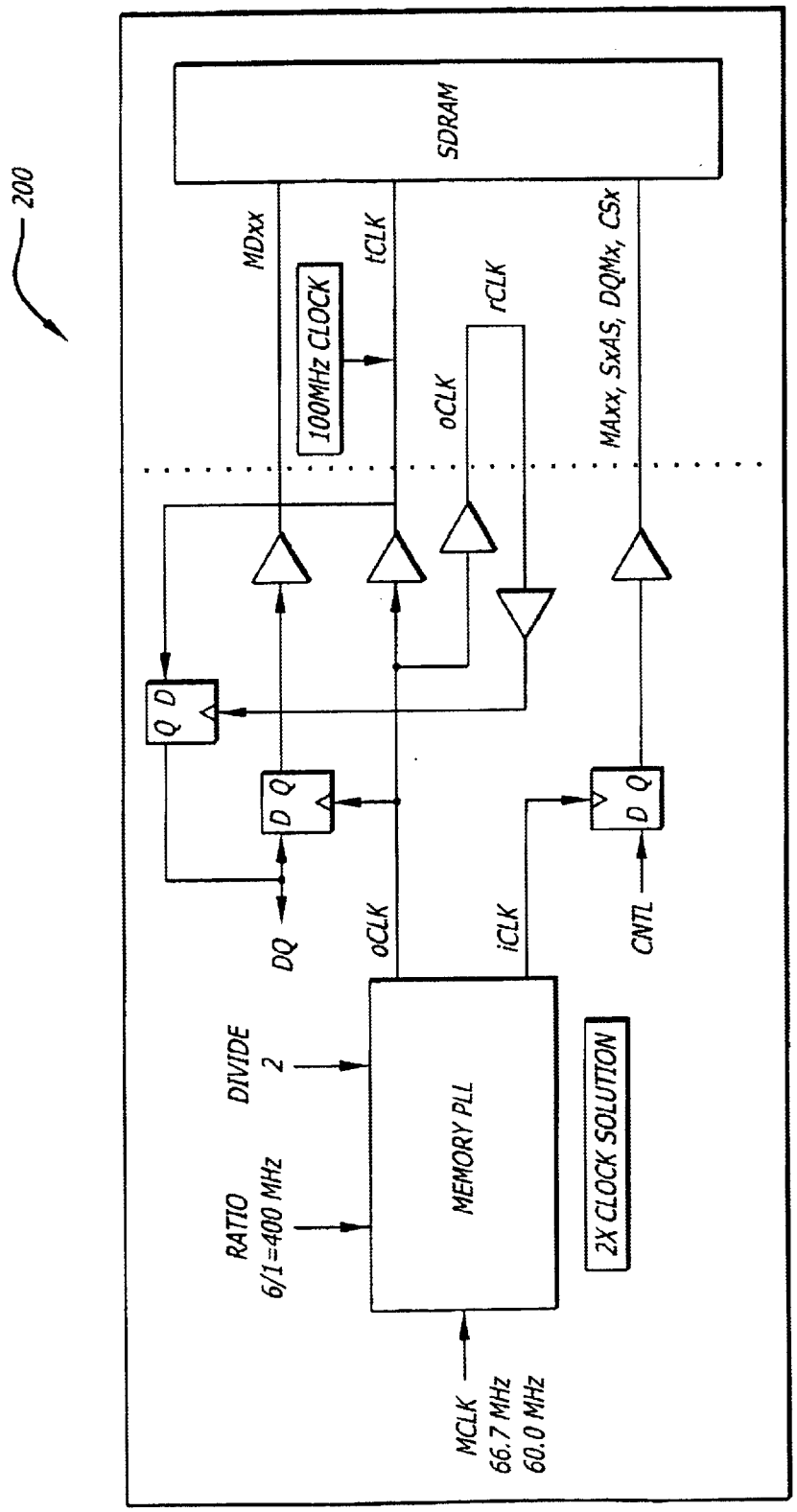
FIG. 2 shows a block diagram of one embodiment of a local memory I/O configuration.

Referring to FIG. 7, the Memory PLL is used to generate the oCLK as described above with respect to FIGS. 1 and 2. The oCLK is used to generate the tCLK, rCLK, and wCLK clock signals. The tCLK (transmit clock) is sent to the local memory 450 and the rCLK (receive clock) is used to latch the incoming data from the local memory (SDRAM) 450. The wCLK clock signal is used to latch both the control signal and the outgoing data to the local memory 450. As shown in FIG. 7, a DLL is included in the rCLK path to adjust the timing of the rCLK clock signal in order to provide balance between the setup and hold margins with respect to the data window for the incoming data from the local memory 450. By using the DLL to adjust the timing of the rCLK, proper balance between setup and hold margins can be achieved which allows for high speed data transfer operations at higher frequencies.

FIG. 8 shows a table of data illustrating setup/hold margins based on the data transfer configuration described in FIG. 7. As shown in FIG. 8, the setup and hold margins are properly balanced at high frequencies (e.g., 125 MHz, 143 MHz, and 150 MHz, etc.). The present invention thus allows for high speed data transfer using programmable DLL without using strobes for writes and reads.

The invention has been described in conjunction with the preferred embodiment. It is evident that numerous alternatives, modifications, variations and uses will be apparent to those skilled in the art in light of the foregoing description.

What is claimed is:

1. A method comprising:

generating a first clock signal having a first transition;

transmitting the first clock signal to an external memory device to cause the memory device to provide requested data in response to the transition of the first clock signal;

deriving a second clock signal having a second transition, the second transition being delayed by a delay locked loop (DLL) circuit relative to the first transition by a first delay period, the first delay period being set responsive to a data transfer frequency of the memory device; and latching the requested data from the memory device using the second transition of the second clock signal.

2. The method of claim 1 wherein the second clock signal is used to clock a latching device to latch the incoming data from the memory device.

3. The method of claim 2 wherein the latching device is a D-type flip-flop.

4. The method of claim 2 wherein the first delay period is used to provide sufficient setup and hold time for the latching device to timely latch the incoming data with respect to a data window corresponding to the incoming data, in response to a transition of the second clock signal.

5. The method of claim 1 wherein the DLL circuit is programmable via a register.

6. The method of claim 3 wherein the first delay period corresponds to a value stored in the register.

7. The method of claim 1 wherein the memory device comprises one or more single data rate synchronous dynamic random access memory (SDR-SDRAM) devices, each SDR-SDRAM having one of a plurality of data transfer frequencies.

8. The method of claim 1 wherein the first clock signal is derived from a third clock signal, the CA third clock signal being derived from a fourth clock signal using a phase locked loop (PLL) circuit.

9. An apparatus comprising:
a first circuit to generate a first clock signal having a first transition;
a second circuit to transmit the first clock signal from the apparatus to an external memory device to cause the memory device to provide requested data in response to the transition of the first clock signal;
a DLL circuit coupled to the first circuit, the DLL circuit to generate a second clock signal having a second transition, the second transition being delayed relative to the first transition by a first delay period, the first delay period being set responsive to a data transfer frequency of the memory device; and
a first latching device coupled to the DLL circuit, the first latching device to latch the requested data from the memory device in response to the second transition of the second clock signal.

10. The apparatus of claim 9 wherein the DLL circuit is programmable via a register.

11. The apparatus of claim 10 wherein the first delay period corresponds to a value stored in the register.

12. The apparatus of claim 9 wherein the first circuit is used to generate a third clock signal, the third clock signal being used to clock a second latching device to transmit output data to the memory device.

13. The apparatus of claim 12 further comprising a third latching device coupled to transmit control data to the memory device, the third latching device being clocked by a fourth clock signal derived from the third clock signal.

14. The apparatus of claim 9 wherein the first latching device comprises a D-type flip flop.

15. The apparatus of claim 9 wherein the memory device comprises one or more single data rate SDRAM devices, each SDR-SDRAM having one plurality of data transfer frequencies.

16. A system comprising:
a memory unit; and
a graphics accelerator coupled to the memory unit, comprising:
a memory interface to control data transfer between the graphics accelerator and the memory unit, the memory interface further comprising:
a first circuit to generate a first clock signal having a first transition;
a second circuit to transmit the first clock signal from the graphics accelerator to the memory unit to cause the memory unit to provide requested data in response to the transition of the first clock signal;
a delay locked loop (DLL) circuit the first circuit, the DLL circuit to generate a second clock signal having a second transition, the second transition being delayed relative to the first transition by a first delay by a first delay period, the first delay period being set responsive to a data transfer frequency of the memory unit; and
a latching device coupled to the DLL circuit, the latching device to latch the requested data from the memory unit in response to the second transition of the second clock signal.

17. The system of claim 16 wherein the DLL circuit is programmable via a register.

18. The system of claim 17 wherein the first delay period corresponds to a value stored in the register.

19. The system of claim 16 further comprising:
a processor; and
a chipset unit coupled to the processor and the graphics accelerator to control data transfer between the processor and the graphics accelerator.

20. An apparatus comprising:
means for generating a first clock signal having a first transition;
means for transmitting the first clock signal to an external memory unit to cause the memory unit to provide requested data in response to the transition of the first clock signal;
means for delaying the first clock signal to generate a second clock having a second transition, the second transition being delayed relative to the first transition by a first delay period, the first delay period being set responsive to a data transfer frequency of the memory unit; and
means for latching the requested data from the memory unit in response to the second transition of the second clock signal.

21. The apparatus of claim 20 wherein the first delay period is used to provide sufficient setup time and hold time for latching the input data from the memory unit.

* * * * *

UNITED STATES PATENT AND TRADEMARK OFFICE
CERTIFICATE OF CORRECTION

PATENT NO. : 6,851,069 B1
DATED : February 1, 2005
INVENTOR(S) : Ahmad et al.

It is certified that error appears in the above-identified patent and that said Letters Patent is hereby corrected as shown below:

Column 5,
Line 5, delete "CA".

Signed and Sealed this

Twenty-sixth Day of April, 2005

JON W. DUDAS
*Director of the United States Patent and Trademark Office*